(12) United States Patent
Ma et al.

(10) Patent No.: US 8,942,143 B2
(45) Date of Patent: Jan. 27, 2015

(54) TIME DIVISION DUPLEX ORTHOGONAL FREQUENCY DIVISION MULTIPLEXING DISTRIBUTED ANTENNA SYSTEM, BASE STATION AND REMOTE ACCESS UNIT

(75) Inventors: Chingwo Ma, New Taipei (TW); I-Chou Chung, Miaoli County (TW); Shih-i Chen, New Taipei (TW); Chi-Hsien Kao, Taipei (TW)

(73) Assignee: Institute For Information Industry, Taipei (TW)

( * ) Notice: Subject to any disclaimer, the term of this patent is extended or adjusted under 35 U.S.C. 154(b) by 715 days.

(21) Appl. No.: 13/295,266

(22) Filed: Nov. 14, 2011

(65) Prior Publication Data

US 2013/0083705 A1 Apr. 4, 2013

(30) Foreign Application Priority Data

Sep. 29, 2011 (TW) .............................. 100135158 A

(51) Int. Cl.
*H04J 3/00* (2006.01)
*H04B 7/02* (2006.01)
*H04L 5/14* (2006.01)
*H04L 27/26* (2006.01)

(52) U.S. Cl.
CPC ................ *H04B 7/024* (2013.01); *H04L 5/14* (2013.01); *H04L 27/2601* (2013.01)
USPC ........... 370/280; 370/293; 370/319; 370/337; 370/347; 370/436

(58) Field of Classification Search
USPC ........ 370/280, 281, 293–295, 319–321, 337, 370/344, 347, 436, 442
See application file for complete search history.

(56) References Cited

U.S. PATENT DOCUMENTS

| | | | |
|---|---|---|---|
| 6,545,997 B1 * | 4/2003 | Bohnke et al. ................ | 370/347 |
| 6,567,383 B1 * | 5/2003 | Bohnke ........................ | 370/280 |
| 2011/0044312 A1 * | 2/2011 | Lee et al. ...................... | 370/344 |
| 2012/0002575 A1 * | 1/2012 | Noh et al. ..................... | 370/280 |

* cited by examiner

*Primary Examiner* — Alvin Zhu
(74) *Attorney, Agent, or Firm* — Skaar Ulbrich Macari, P.A.

(57) ABSTRACT

A time division duplex orthogonal frequency division multiplexing (TDD-OFDM) distributed antenna system (DAS), a base station and a remote access unit for the same are provided. The base station performs an inverse fast Fourier transform on a user downlink signal, a transmitting/receiving enable signal and an input control signal to generate a first OFDM signal. The user downlink signal is carried on a used subcarrier set of the first OFDM signal, while the transmitting/receiving enable signal and the input control signal are carried on a guard band subcarrier set of the first OFDM signal. The remote access unit receives the first OFDM signal via a fiber transmission line, switches between a transmitting mode and a receiving mode periodically, performs a clock synchronization with the base station according to the transmitting/receiving enable signal, and performs a system configuration according to the input control signal.

20 Claims, 6 Drawing Sheets

TIME DIVISION DUPLEX ORTHOGONAL FREQUENCY DIVISION MULTIPLEXING DISTRIBUTED ANTENNA SYSTEM, BASE STATION AND REMOTE ACCESS UNIT

PRIORITY

This application claims priority based on Taiwan Patent Application No. 100135158, filed on Sep. 29, 2011, which is hereby incorporated by reference in its entirety.

FIELD

The present invention relates to a time division duplex orthogonal frequency division multiplexing (TDD-OFDM) distributed antenna system (DAS), a base station and a remote access unit (RAU) for the same. More particularly, the base station of the present invention generates a first orthogonal frequency division multiplexing (OFDM) signal by performing an inverse fast Fourier transform on a user downlink signal, a transmitting/receiving enable signal and an input control signal to eliminate the use of a frequency-division multiplexing bandpass (FDM BP) filter bank as in the prior art; the remote access unit of the present invention can switch between a transmitting mode and a receiving mode periodically and perform a clock synchronization with the base station according to the transmitting/receiving enable signal.

BACKGROUND

With the development of orthogonal frequency division multiplexing (OFDM) systems and the deployment of optical fiber transmission lines, base stations of Worldwide Interoperability for Microwave Access (WiMax) communication systems, 3GPP Long Term Evolution (LTE) communication systems and other OFDM mobile communication systems have gradually evolved from co-located antenna systems (CASs) into distributed antenna system (DASs). As compared to co-located antenna systems, distributed antenna systems can extend the signal coverage, lower the deployment cost of base stations and reduce the overall signal transmission power. Therefore, distributed antenna systems have become a development tendency for the deployment of base stations.

A conventional TDD-OFDM distributed antenna system 1 is as shown in FIG. 1. The distributed antenna system 1 comprises a base station 11 (as known as a centralized plant or a headend) and a remote access unit (RAU) 13. The base station 11 connects to the RAU 13 via a fiber transmission line 15. The base station 11 comprises a signal processing circuit 111, an FDM BP filter bank 113, a control circuit 115 and a fiber transceiver 117. The signal processing circuit 111 receives a user downlink signal 102 from a backhaul network and performs an inverse fast Fourier transform on the user downlink signal 102 to generate a first OFDM signal 104. The FDM BP filter bank 113 receives a clock synchronization signal 106 from the control circuit 115 and an input control signal 108 carried on a specific band.

Then, the fiber transceiver 117 receives the first OFDM signal 104, the clock synchronization signal 106 and the input control signal 108, combines them with each other, and transmits them to the RAU 13. The RAU 13 comprises a radio frequency (RF) transceiver 131, an FDM BP filter bank 133, a fiber transceiver 135, a synchronization circuit 137 and a control circuit 139. The fiber transceiver 135 receives and transmits the first OFDM signal 104, the clock synchronization signal 106 and the input control signal 108 to the RF transceiver 131 and the FDM BP filter bank 133. It shall be noted that in practical operations, the fiber transceiver 117 and the fiber transceiver 135 convert electric signals to be transmitted (e.g., the first OFDM signal 104 and the input control signal 108) into optical signals for transmission through fiber transmission lines, and convert optical signals that are received into electric signals. However, for the purpose of simplicity, the method in which the fiber transceivers transmit and receive signals and the conversions between the electric signals and optical signals will not be described herein.

After receiving the first OFDM signal 104, the clock synchronization signal 106 and the input control signal 108, the RF transceiver 131 detects the energy of the received signals (i.e., the total energy of the first OFDM signal 104, the clock synchronization signal 106 and the input control signal 108). Based on the time in which the energy of the received signals is greater than the preset value, the RF transceiver 131 switches between a transmitting mode and a receiving mode periodically. In the transmitting mode, the RF transceiver 131 transmits the first OFDM 104 via an antenna (not shown) but filters out other signals than the first OFDM signal 104.

On the other hand, after receiving the first OFDM signal 104, the clock synchronization signal 106 and the input control signal 108, the FDM BP filter bank 133 retrieves the clock synchronization signal 106 from the specific band and transmits the clock synchronization signal 106 to the synchronization circuit 137, and retrieves the input control circuit 108 from the specific band and transmits the input control circuit 108 to the control circuit 139. Then, the synchronization circuit 137 performs a clock synchronization with the base station 11 according to the clock synchronization signal 106, and the control circuit 139 performs a system configuration according to the input control signal 108. For example, the input control signal 108 may comprise gain control parameters for a power amplifier, gain setting parameters for a low-noise amplifier, receiving filter band options, phase lock loop (PLL) frequency options or other system setting parameters.

In the receiving mode, the RF transceiver 131 receives a user uplink signal 110 via an antenna (not shown) and transmits the user uplink signal 110 to the fiber transceiver 135. At this point, an output state signal 112 carried on the specific band is generated by the control circuit 139 as a state reported for network management. The output state signal 112 comprises a PLL lock detection state, a temperature sensor output state and other system states. The output state signal 112 is transmitted to the fiber transceiver 135 via the FDM BP filter bank 133. The fiber transceiver 135 receives the user uplink signal 110 and the output state signal 112, combines the user uplink signal 110 and the output state signal 112 together, and transmits them to the base station 11.

The fiber transceiver 117 of the base station 11 receives and transmits the user uplink signal 110 and the output state signal 112 to the signal processing circuit 111 and an FDM BP filter bank 113. The signal processing circuit 111 filters out the signals other than the user uplink signal 110, performs a fast Fourier transform on the user uplink signal 110 and transmits the transformed user uplink signal 110 to the backhaul network. The FDM BP filter bank 113 retrieves the output state signal 112 from the specific band and transmits the output state signal 112 to the control circuit 115 and the backhaul network.

As can be known from the above description, because the received signals in the conventional TDD-OFDM distributed antenna system belong to analog signals, they are liable to attenuation and interferences during transmission; consequently, the reliability of the preset values can only be ensured through an adaptive setting. Furthermore, because filtering must be performed by the FDM BP filter bank 113 on the clock synchronization signal 106 and the input control signal 108 before they are transmitted and on the output control signal 112 after it is received, the hardware cost of the FDM BP filter bank 113 is inevitable for the base station 111.

Accordingly, an urgent need exists in the art to improve the mechanism of switching the RAU between the transmitting mode and the receiving mode and to lower the hardware cost of the base station.

SUMMARY

An objective of the present invention is to provide a time division duplex orthogonal frequency division multiplexing (TDD-OFDM) distributed antenna system (DAS), and a base station and a remote access unit (RAU) for the same. The base station of the present invention performs an inverse fast Fourier transform on a user downlink signal, a transmitting/receiving enable signal and an input control signal to generate a first OFDM signal. Thereby, the base station of the present invention can eliminate the use of a frequency-division multiplexing bandpass (FDM BP) filter bank as in the prior art. Furthermore, the remote access unit of the present invention can switch between a transmitting mode and a receiving mode periodically and perform a clock synchronization with the base station according to the transmitting/receiving enable signal.

To achieve the aforesaid objective, certain embodiments of the present invention disclose a time division duplex orthogonal frequency division multiplexing (TDD-OFDM) distributed antenna system (DAS). The TDD-OFDM distributed antenna system include using a transmission band comprising a used band subcarrier set and a guard band subcarrier set. The TDD-OFDM distributed antenna system comprises a base station and an RAU. The base station is configured to perform an inverse fast Fourier transform on a user downlink signal, a transmitting/receiving enable signal and an input control signal to generate a first OFDM signal. The user downlink signal is carried on the used subcarrier set of the first OFDM signal, and the transmitting/receiving enable signal and the input control signal are carried on the guard band subcarrier set of the first OFDM signal. The RAU is connected to the base station via a fiber transmission line, and is configured to receive the first OFDM signal and filter the transmitting/receiving enable signal and the input control signal carried on the guard band subcarrier set of the first OFDM signal to generate a second OFDM signal. The RAU is further configured to retrieve the transmitting/receiving enable signal and the input control signal from the guard band subcarrier set of the first OFDM signal, switch between a transmitting mode and a receiving mode periodically according to the transmitting/receiving enable signal, transmit the second OFDM signal to a user device in the transmitting mode, perform a clock synchronization with the base station according to the transmitting/receiving enable signal, and perform a system configuration according to the input control signal.

The present invention in certain embodiments further discloses a base station of a time division duplex orthogonal frequency division multiplexing (TDD-OFDM) distributed antenna system (DAS). The base station comprises a signal processing unit and a fiber transceiver. The signal processing circuit is configured to perform an inverse fast Fourier transform on a user downlink signal, a transmitting/receiving enable signal and an input control signal to generate a first OFDM signal. The user downlink signal is carried on the used subcarrier set of the first OFDM signal, while the transmitting/receiving enable signal and the input control signal are carried on the guard band subcarrier set of the first OFDM signal. The fiber transceiver is electrically connected to the signal processing circuit and is connected to a remote access unit (RAU) via a fiber transmission line. The fiber transceiver is configured to transmit the first OFDM signal to the RAU via the fiber transmission line, so that the RAU filters out the transmitting/receiving enable signal and the input control signal carried on the guard band subcarrier set of the first OFDM signal to generate a second OFDM signal, retrieves the transmitting/receiving enable signal and the input control signal from the guard band subcarrier set of the first OFDM signal, switches between a transmitting mode and a receiving mode periodically according to the transmitting/receiving enable signal, and transmits the second OFDM signal to a user device in the transmitting mode. The RAU further performs a clock synchronization with the base station according to the transmitting/receiving enable signal, and performs a system configuration according to the input control signal.

The present invention in certain embodiments further discloses a remote access unit (RAU) of a time division duplex orthogonal frequency division multiplexing (TDD-OFDM) distributed antenna system (DAS). The RAU comprises a fiber transceiver, a radio frequency (RF) transceiver, a frequency division multiplexing bandpass (FDM BP) filter bank, a synchronization circuit and a control circuit. The fiber transceiver is connected to a base station via a fiber transmission line and is configured to receive the first OFDM signal from the base station via the fiber transmission line. The base station performs an inverse fast Fourier transform on a user downlink signal, a transmitting/receiving enable signal and an input control signal to generate the first OFDM signal. The user downlink signal is carried on the used subcarrier set of the first OFDM signal, while the transmitting/receiving enable signal and the input control signal are carried on the guard band subcarrier set of the first OFDM signal. The RF transceiver is electrically connected to the fiber transceiver, and is configured to filter out both the transmitting/receiving enable signal and the input control signal that is carried on the guard band subcarrier set in the first OFDM signal to generate a second OFDM signal. The FDM BP filter bank is electrically connected to the fiber transceiver, and is configured to retrieve the transmitting/receiving enable signal and the input control signal from the guard band subcarrier set of the first OFDM signal. The synchronization circuit is electrically connected to the frequency division multiplexing bandpass filter bank, and is configured to perform a clock synchronization with the base station according to the transmitting/receiving enable signal. The control circuit is electrically connected to the frequency division multiplexing bandpass filter bank, and is configured to perform a system configuration according to the input control signal, switch between a transmitting mode and a receiving mode periodically according to the transmitting/receiving enable signal and transmit the second OFDM signal to the user device in the transmitting mode.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

The following example embodiments are provided to illustrate but not to limit the present invention. It should be appreciated that in the following embodiments and the attached drawings, elements unrelated to the present invention are omitted from depiction; and the dimensional relationships among the individual elements in the attached drawings are illustrated only for ease of understanding, but not to limit the actual scale.

Figure 1:
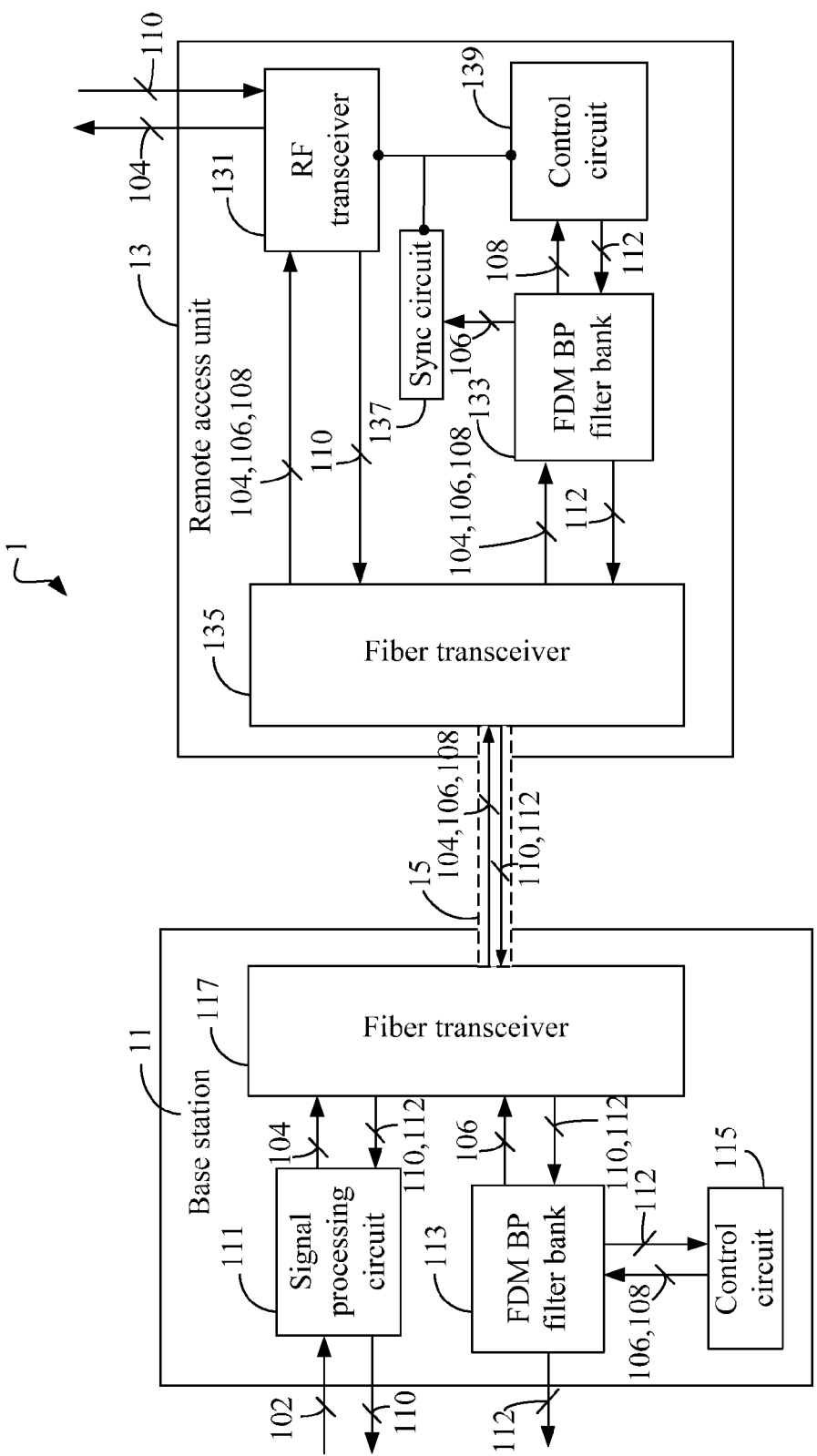
FIG. 1 is a schematic view of a conventional TDD-OFDM distributed antenna system 1.
Figure 2:
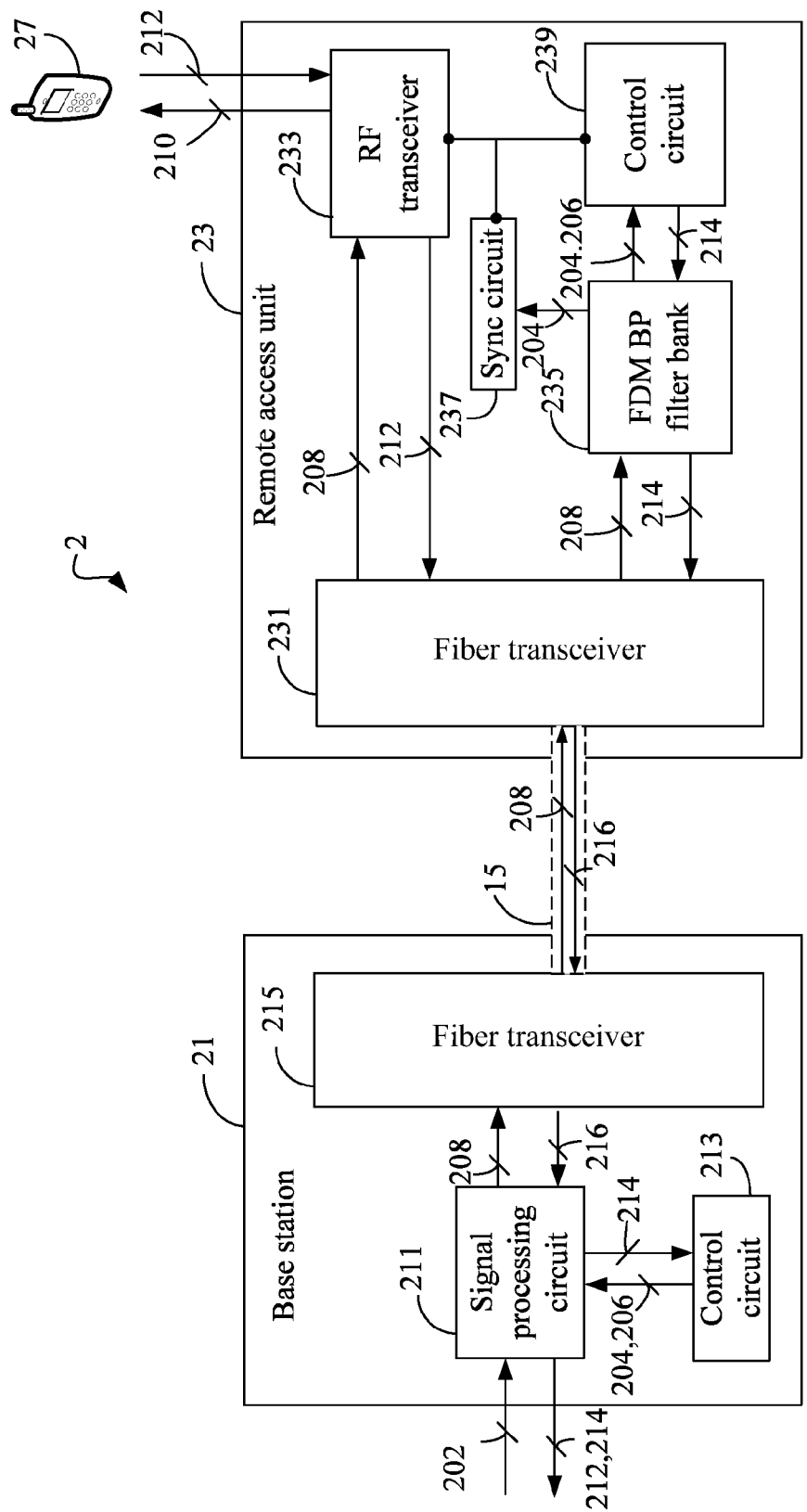
FIG. 2 is a schematic view of a TDD-OFDM distributed antenna system 2 according to an embodiment of the present invention.

The first embodiment of the present invention is shown in FIG. 2, which depicts a time division duplex orthogonal frequency division multiplexing (TDD-OFDM) distributed antenna system (DAS) 2. The TDD-OFDM distributed antenna system 2 comprises a base station 21 and a remote access unit (RAU) 23. The base station 21 is connected to the RAU 23 via a fiber transmission line 15 to transmit signals through the fiber transmission line 15.

The TDD-OFDM distributed antenna system 2 of the present invention may be used in a WiMax communication system, a 3GPP LTE communication system or any other TDD-OFDM mobile communication system. The TDD-OFDM distributed antenna system uses a transmission band comprising a used band subcarrier set and a guard band subcarrier set for signal transmission. For example, in a WiMax 802.16e communication system, the transmission band has a bandwidth of 10 MHz, in which the used band subcarrier set comprises 841 subcarriers and the guard band subcarrier set comprises 183 subcarriers.

Figure 3:
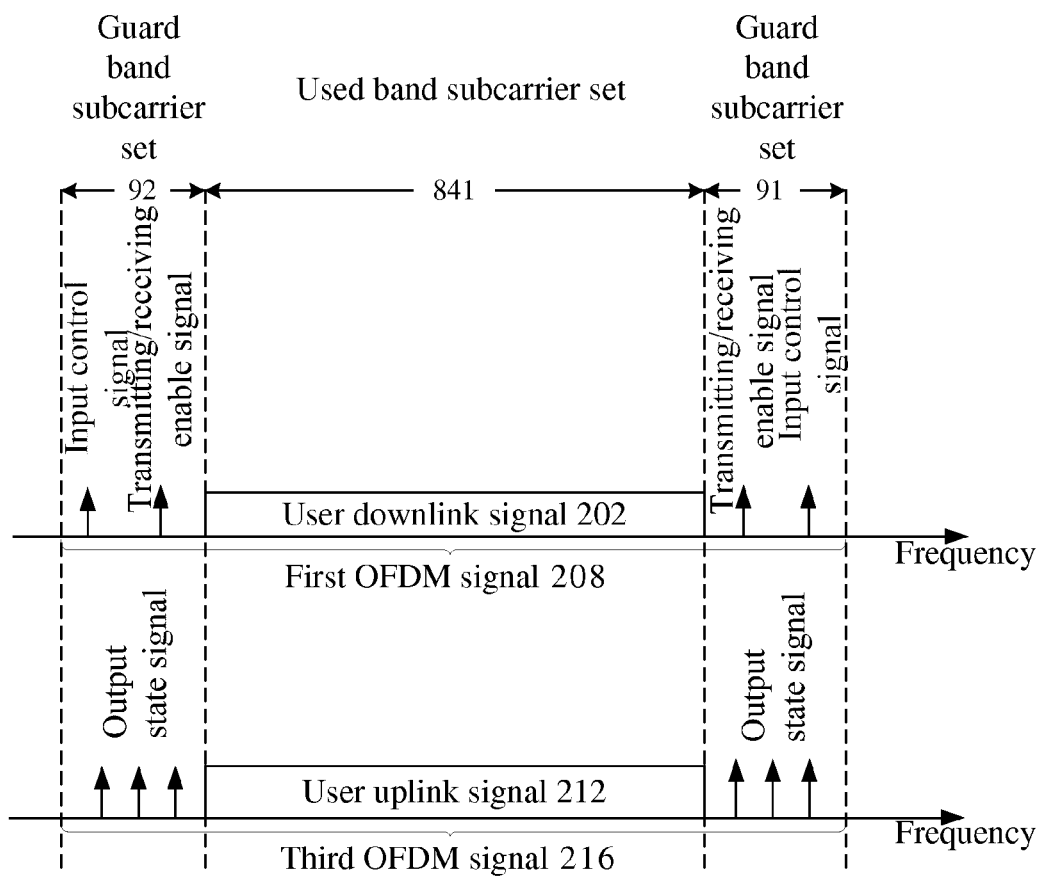
FIG. 3 depicts how the signals are carried in a first OFDM signal 208 and a third OFDM signal 216 according to the present invention.

When the base station 21 receives a user downlink signal 202 from the backhaul network to transmit the user downlink signal 202 to the RAU 23, the base station 21 generates a transmitting/receiving enable signal (TxRx_EN signal) 204 and an input control signal 206. Then, the base station 21 performs an inverse fast Fourier transform on the user downlink signal 202, the transmitting/receiving enable signal 204 and the input control signal 206 to generate a first OFDM signal 208. After the inverse fast Fourier transform is completed, the user downlink signal 202 is carried on the used band subcarrier set of the first OFDM signal 208, and the transmitting/receiving enable signal 204 and the input control signal 206 are carried on the guard band subcarrier set of the first OFDM signal 208. As shown in FIG. 3, using WiMax 802.16e communication system as an example, the 841 subcarriers in the used band may be used to transmit the user downlink signal 202, and the 183 subcarriers (i.e., 92 subcarriers in the left guard band plus 91 subcarriers in the right guard band) in the guard band may be used to transmit the transmitting/receiving enable signal 204 and the input control signal 206.

After receiving the first OFDM signal 208 via the fiber transmission line 15, the RAU 23 filters out the transmitting/receiving enable signal 204 and the input control signal 206 that is carried on the guard band subcarrier set of the first OFDM signal 208 to generate a second OFDM signal 210.

Additionally, the RAU 23 further retrieves the transmitting/receiving enable signal 204 and the input control signal 206 from the guard band subcarrier set of the first OFDM signal 208 to switch between a transmitting mode and a receiving mode periodically according to the transmitting/receiving enable signal 204, and transmits the second OFDM signal 210 to a user device 27 in the transmitting mode. Meanwhile, the RAU 23 performs both a clock synchronization with the base station 21 according to the transmitting/receiving enable signal 204, and a system configuration according to the input control signal 206.

Figure 4:
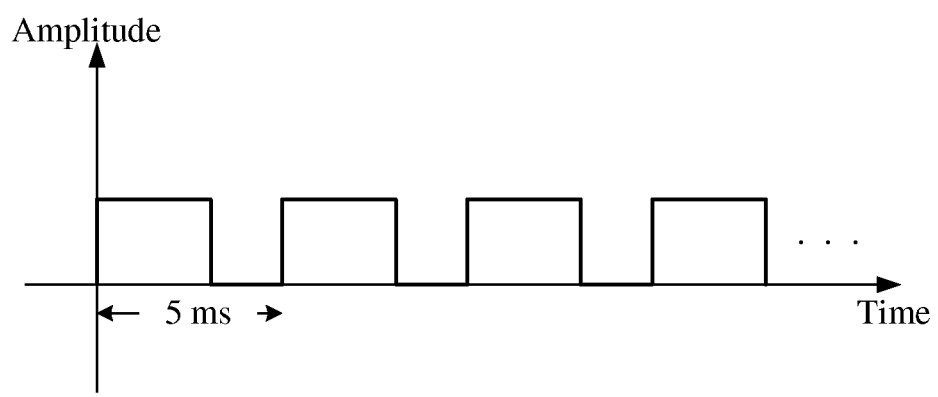
FIG. 4 depicts a periodical pulse signal used to generate a transmitting/receiving enable signal 204.

For example, as shown in FIG. 4, the transmitting/receiving enable signal 204 may be generated according to a periodical pulse signal (e.g., having a period of 5 milliseconds). Within a period, a high amplitude interval represents that a transmitting/receiving enable signal is transmitted, while a low amplitude interval represents that no transmitting/receiving enable signal is transmitted. Accordingly, the high amplitude interval represents the interval in which the transmitting mode is active, while the low amplitude interval represents the interval in which the receiving mode is active. Therefore, the RAU 23 can switch between the transmitting mode and the receiving mode according to the transmitting/receiving enable signal 204. On the other hand, because the transmitting/receiving enable signal 204 is transmitted according to a fixed periodical pulse signal, the RAU 23 may also use the transmitting/receiving enable signal 204 as a basis for synchronizing the clock of its local oscillator with that of the local oscillator of the base station 21.

Next, when being switched into the receiving mode, the RAU 23 receives a user uplink signal 212 from the user. Meanwhile, the RAU 23 generates an output state signal 214, combines the user uplink signal 212 with the output state signal 214 to generate a third OFDM signal 216, and transmits the third OFDM signal 216 to the base station 21 via the fiber transmission line 15. Similarly, the user uplink signal 212 is carried on the used subcarrier set of the third OFDM signal 216, while the output state signal 214 is carried on the guard band subcarrier set of the third OFDM signal 216, as shown in FIG. 3. Thereafter, the base station 21 receives the third OFDM signal 216 and performs a fast Fourier transform on the third OFDM signal 216 to obtain the user uplink signal 212 and the output state signal 214.

In particular, the base station 21 comprises a signal processing circuit 211, a control circuit 213 and a fiber transceiver 215. The signal processing circuit 211 is electrically connected to the control circuit 213 and the fiber transceiver 215, while the fiber transceiver 215 is connected to the RAU 23 via the fiber transmission line 15. The control circuit 213 is configured to generate the transmitting/receiving enable signal 204 and the input control signal 206. The signal processing circuit 211 receives the user downlink signal 202 from the backhaul network and receives the transmitting/receiving enable signal 204 from the control circuit 213, and then performs an inverse fast Fourier transform on the user downlink signal 202, the transmitting/receiving enable signal 204 and the input control signal 206 to generate the first OFDM signal 208. Afterwards, the first OFDM signal 208 is transmitted by the fiber transceiver 215 to the RAU 23 via the fiber transmission line 15.

The RAU 23 comprises a fiber transceiver 231, an RF transceiver 233, an FDM BP filter bank 235, a synchronization circuit 237 and a control circuit 239. The fiber transceiver 231 is connected to the base station 21 via the fiber transmission line 15, and receives the first OFDM signal 208 from the base station 21 via the fiber transmission line 15. The RF transceiver 233 is electrically connected to the fiber transceiver 231, receives the first OFDM signal 208 from the fiber transceiver 231, and filters out the transmitting/receiving enable signal 204 and the input control signal 206 that is carried on the guard band subcarrier set of the first OFDM signal 208 to generate the second OFDM signal 210.

The FDM BP filter bank 235 is electrically connected to the fiber transceiver, and retrieves the transmitting/receiving enable signal 204 and the input control signal 206 from the guard band subcarrier set of the first OFDM signal 208. The synchronization circuit 237 is electrically connected to the FDM BP filter bank 235, and performs the clock synchronization with the base station 21 according to the transmitting/receiving enable signal 204. The synchronization circuit 237 comprises a phase lock loop (PLL), which is configured to synchronize the clock of the local oscillator of the RAU 23 with the clock of the local oscillator of the base station 21 according to the transmitting/receiving enable signal 204.

The control circuit 239 is electrically connected to the FDM BP filter bank 235 and performs a system configuration according to the input control signal 206. For example, the input control signal 206 may comprise gain control parameters for a power amplifier, gain settings for a low-noise amplifier, receiving filter band options, phase lock loop (PLL) frequency options or other system setting parameters. Thereby, the control circuit 239 can adjust or set related elements of the RAU 23 according to these parameters.

The control circuit 239 further switches the RF transceiver 233 between the transmitting mode and the receiving mode periodically according to the transmitting/receiving enable signal 204 so that the RF transceiver 233 transmits the second OFDM signal 210 to the user device 27 in the transmitting mode and receives a user uplink signal 212 from the user device 27 in the receiving mode. In the receiving mode, the RAU 23 receives a user uplink signal 212 from the user device and transmits the user uplink signal 212 to the fiber transceiver 231. At this moment, an output state signal 214 is generated by the control circuit 239 and transmitted to the fiber transceiver 231 via the FDM BP filter bank 235. Then, the fiber transceiver 231 combines the user uplink signal 212 with the output state signal 214 to generate a third OFDM signal 216, and transmits the third OFDM signal 216 to the base station 21 via the fiber transmission line 15.

After receiving the third OFDM signal 216, the fiber transceiver 215 of the base station 21 transmits the third OFDM signal 216 to the signal processing circuit 211. The signal processing circuit 211 performs a fast Fourier transform on the third OFDM signal 216 to obtain the user uplink signal 212 and the output state signal 214. Subsequently, the signal processing circuit 211 outputs the user uplink signal 212 and the output state signal 214 to the backhaul network and also transmits the output state signal 214 to the control circuit 213.

Additionally, in the present invention, the transmitting/receiving enable signal 204 and the input control signal 206 may be interleavingly carried on the guard band subcarrier set in the first OFDM signal 208, and the output state signal 214 may be interleavingly carried on the guard band subcarrier set of the third OFDM signal 216. In other words, there is at least one subcarrier that is not carrying any signal between any two subcarriers carrying signals in the guard band subcarrier set. The way in which the signals are carried makes the design of the FDM BP filter bank 235 simpler, i.e., the cut-off of the filter bank may be made smoother and the order can be reduced.

Figure 5A:
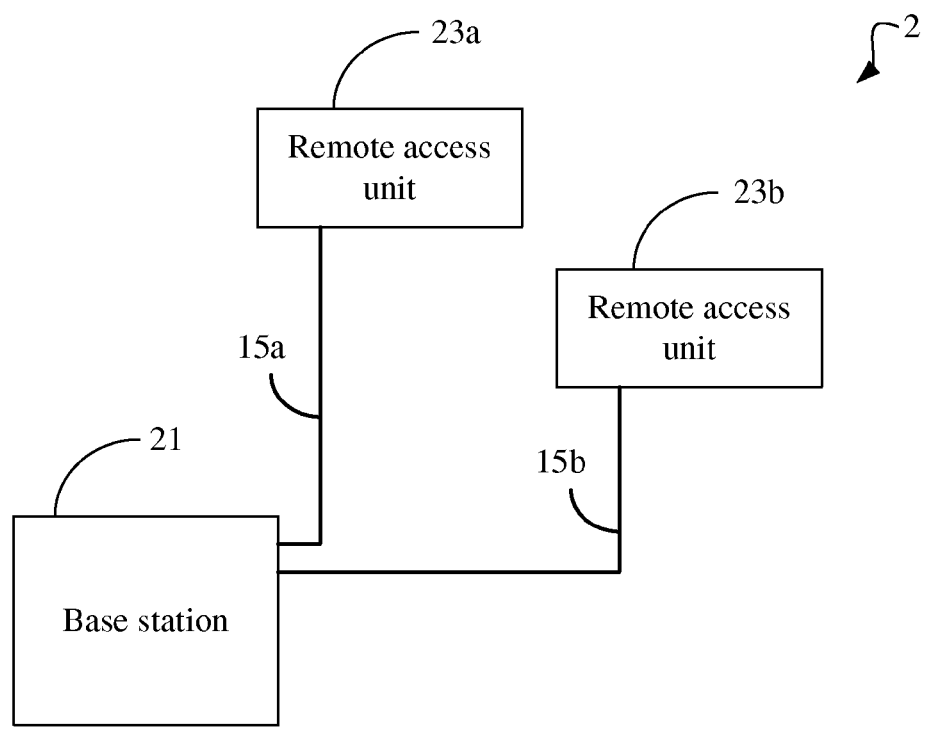
FIGS. 5A-5B depict a TDD-OFDM distributed antenna system 2 according to another embodiment of the present invention.
Figure 5B:
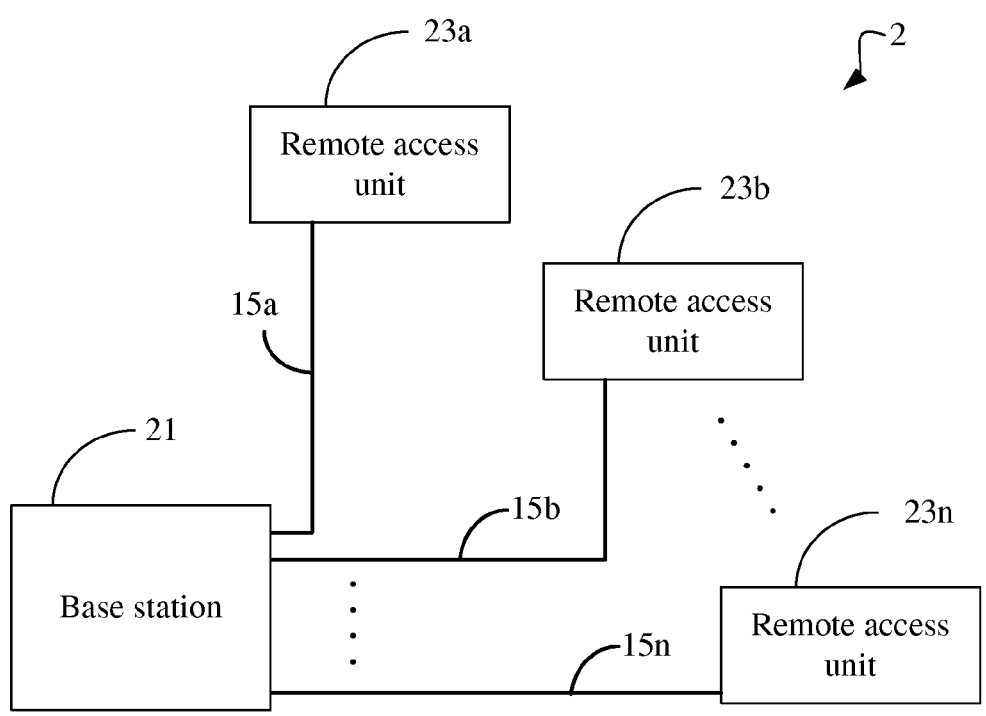

Another embodiment of the present invention is shown in FIGS. 5A to 5B. The TDD-OFDM distributed antenna system of the present invention may comprise two RAUs 23a, 23b as shown in FIG. 5A, or a plurality of RAUs 23a, 23b, ..., 23n as shown in FIG. 5B. The RAUs 23a, 23b, ..., 23n are all substantially the same as the RAU 23, and are each connected to the base station 21 via a respective fiber transmission line 15a, 15b, ..., 15n. Each of the RAUs 23a, 23b, ..., 23n can receive the first OFDM signal 208, and filter out the transmitting/receiving enable signal 204 and the input control signal 206 carried on the guard band subcarrier set of the first OFDM signal 208 to generate the second OFDM signal 210 for transmission to the user device 27.

Similarly, each of the RAUs 23a, 23b, ..., 23n may also retrieve the transmitting/receiving enable signal 204 and the input control signal 206 from the guard band subcarrier set of the first OFDM signal 208, switch between the transmitting mode and the receiving mode periodically according to the transmitting/receiving enable signal 204, perform the clock synchronization with the base station 21, and perform the system configuration according to the input control signal 206. Additionally, the base station 21 may also receive a third OFDM signal 216 that carries the user uplink signal 212 and the output state signal 214 from each of the RAUs 23a, 23b, ..., 23n.

According to the above descriptions, instead of using an FDM BP filter bank as in the prior art, the base station of the present invention performs an inverse fast Fourier transform on the user downlink signal, the transmitting/receiving enable signal and the input control signal directly and incorporates them into the used band subcarrier set and the guard band subcarrier set of an OFDM signal for transmission to the RAU. After receiving a user uplink signal from the user device, the RAU combines the user uplink signal with the output state signal to generate another OFDM signal for transmission to the base station. Through the signal processing circuit, the base station can perform a fast Fourier transform on the another OFDM signal to obtain the user uplink signal carried on the used band subcarrier set of the another OFDM signal and the output state signal carrier on the guard band subcarrier set. In this way, the present invention can not only make full use of the preexistent signal processing circuit and the transmission band of the TDD-OFDM distributed antenna system, but also reduce the hardware cost of the base station.

Furthermore, according to the present invention, a transmitting/receiving enable signal is transmitted to the RAU so that the RAU switches the RF transceiver between the transmitting mode and the receiving mode according to the transmitting/receiving enable signal. Thus, the way of utilizing the received signal strength to switch the RF transceiver between the transmitting mode and the receiving mode in the prior art can be replaced. Meanwhile, the RAU may also perform a clock synchronization with the base station according to the transmitting/receiving enable signal.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A time division duplex (TDD) orthogonal frequency division multiplexing (OFDM) distributed antenna system (DAS), the TDD-OFDM DAS using a transmission band comprising a used band subcarrier set and a guard band subcarrier set, the TDD-OFDM DAS comprising:

a base station, being configured to perform an inverse fast Fourier transform on a user downlink signal, a transmitting/receiving enable signal and an input control signal to generate a first OFDM signal, the user downlink signal being carried on the used subcarrier set of the first OFDM signal, and the transmitting/receiving enable signal and the input control signal being carried on the guard band subcarrier set of the first OFDM signal;

a remote access unit (RAU), being connected to the base station via a fiber transmission line and being configured to receive the first OFDM signal and filter the transmitting/receiving enable signal and the input control signal carried on the guard band subcarrier set of the first OFDM signal to generate a second OFDM signal;

wherein the RAU is further configured to retrieve the transmitting/receiving enable signal and the input control signal from the guard band subcarrier set of the first OFDM signal, switch between a transmitting mode and a receiving mode periodically according to the transmitting/receiving enable signal, transmit the second OFDM signal to a user device in the transmitting mode, perform a clock synchronization with the base station according to the transmitting/receiving enable signal, and perform a system configuration according to the input control signal.

2. The TDD-OFDM DAS of claim 1, wherein the base station further comprises a fiber transceiver being configured to transmit the first OFDM signal to the RAU, and the RAU further comprises a fiber transceiver to receive the first OFDM signal.

3. The TDD-OFDM DAS of claim 1, wherein the RAU further comprises a synchronization circuit being configured to perform the clock synchronization with the base station according to the transmitting/receiving enable signal.

4. The TDD-OFDM DAS of claim 3, wherein the RAU further comprises a control circuit being configured to perform the system configuration according to the input control signal.

5. The TDD-OFDM DAS of claim 4, wherein the base station further comprises a signal processing circuit being configured to perform the inverse fast Fourier transform to generate the first OFDM signal.

6. The TDD-OFDM DAS of claim 5, wherein the RAU further comprises a frequency division multiplexing bandpass filter bank being configured to retrieve the transmitting/receiving enable signal and the input control signal from the guard band subcarrier set of the first OFDM signal.

7. The TDD-OFDM DAS of claim 6, wherein the RAU further comprises a radio frequency (RF) transceiver being configured to filter the transmitting/receiving enable signal and the input control signal carried on the used subcarrier set of the first OFDM signal to generate a second OFDM signal, and the control circuit switches between the transmitting mode and the receiving mode periodically according to the transmitting/receiving enable signal to enable the RF transceiver to transmit the second OFDM signal to the user device in the transmitting mode and receive a user uplink signal from the user in the receiving mode.

8. The TDD-OFDM DAS of claim 7, wherein the control circuit is further configured to generate and transmit an output state signal to the frequency division multiplexing bandpass filter bank, the RAU further comprises a fiber transceiver being configured to combine the user uplink signal with the output state signal to generate a third OFDM signal and transmit the third OFDM signal to the base station via the fiber transmission line, the user uplink signal is carried on the used subcarrier set of the third OFDM signal, and the output state signal is carried on the guard band subcarrier set of the third OFDM signal.

9. The TDD-OFDM DAS of claim 8, wherein the signal processing circuit of the base station further performs a fast Fourier transform to the third OFDM signal to obtain the user uplink signal and the output state signal.

10. The TDD-OFDM DAS of claim 8, wherein the transmitting/receiving enable signal and the input state signal are interleavingly carried on the guard band subcarrier set in the first OFDM signal, and the output state signal is interleavingly carried on the guard band subcarrier set of the third OFDM signal.

11. The TDD-OFDM DAS of claim 1, wherein further comprising another RAU, wherein the another RAU is connected to the base station by another fiber transmission line, and is configured to receive the first OFDM signal via the another fiber transmission line, filter the transmitting/receiving enable signal and the input control signal carried on the guard band subcarrier set of the first OFDM signal to generate the second OFDM signal, and transmit the second OFDM signal to the user device, the another RAU is further configured to retrieve the transmitting/receiving enable signal and the input control signal from the guard band subcarrier set of the first OFDM signal, switch between the transmitting mode and the receiving mode periodically according to the transmitting/receiving enable signal, perform the clock synchronization with the base station, and perform the system configuration according to the input control signal.

12. A base station of a time division duplex orthogonal frequency division multiplexing distributed antenna system (TDD-OFDM DAS), the base station using a transmission band comprising a used band subcarrier set and a guard band subcarrier set, the base station comprising:

a signal processing circuit, being configured to perform an inverse fast Fourier transform on a user downlink signal, a transmitting/receiving enable signal and an input control signal to generate a first OFDM signal, the user downlink signal being carried on the used subcarrier set of the first OFDM signal, and the transmitting/receiving enable signal and the input control signal being carried on the guard band subcarrier set of the first OFDM signal; and a fiber transceiver, being electrically connected to the signal processing circuit and being connected to a remote access unit (RAU) via a fiber transmission line, and being configured to transmit the first OFDM signal to the RAU via the fiber transmission line, so that the RAU filters the transmitting/receiving enable signal and the input control signal carried on the guard band subcarrier set of the first OFDM signal to generate a second OFDM signal, retrieves the transmitting/receiving enable signal and the input control signal from the guard band subcarrier set of the first OFDM signal, switches between a transmitting mode and a receiving mode periodically according to the transmitting/receiving enable signal, transmits the second OFDM signal to a user device in the transmitting mode, performs a clock synchronization with the base station according to the transmitting/receiving enable signal, and performs a system configuration according to the input control signal.

13. The base station of claim 12, wherein the RAU further receives a user uplink signal from the user device and combines the user uplink signal with the output state signal to generate the third OFDM signal, the output state signal is carried on the guard band subcarrier set of the third OFDM signal, the user uplink signal is carried on the used subcarrier set of the third OFDM signal, the fiber transceiver receives the third OFDM signal from the RAU via the fiber transmission line, and the signal processing circuit performs an fast Fourier transform on the third OFDM signal to obtain the user uplink signal and the output state signal.

14. The base station of claim 13, wherein the transmitting/receiving enable signal and the input control signal are interleavingly carried on the guard band subcarrier set in the first OFDM signal, and the output state signal is interleavingly carried on the guard band subcarrier set of the third OFDM signal.

15. The base station of claim 12, comprising a control circuit being configured to generate the transmitting/receiving enable signal and the input control signal.

16. The base station of claim 12, wherein the fiber transceiver is connected to another RAU via another fiber transmission line to transmit the first OFDM signal to the another RAU via the another fiber transmission line so that the another RAU filters the transmitting/receiving enable signal and the input control signal carried on the guard band subcarrier set of the first OFDM signal to generate a second OFDM signal, transmits the second OFDM signal to the user device, retrieves the transmitting/receiving enable signal and the input control signal from the guard band subcarrier set of the first OFDM signal, switches between the transmitting mode and the receiving mode periodically according to the transmitting/receiving enable signal, performs a clock synchronization with the base station according to the transmitting/receiving enable signal, and performs a system configuration according to the input control signal.

17. A remote access unit (RAU) of a time division duplex orthogonal frequency division multiplexing distributed antenna system (TDD-OFDM DAS) using a transmission band comprising a used band subcarrier set and a guard band subcarrier set, the RAU comprising:
 a fiber transceiver, being connected to a base station via a fiber transmission line and being configured to receive the first OFDM signal from the base station via the fiber transmission line, the base station performing an inverse fast Fourier transform on a user downlink signal, a transmitting/receiving enable signal and an input control signal to generate the first OFDM signal, the user downlink signal being carried on the used subcarrier set of the first OFDM signal, and the transmitting/receiving enable signal and the input control signal being carried on the guard band subcarrier set of the first OFDM signal;
 an RF transceiver, being electrically connected to the fiber transceiver and being configured to filter the transmitting/receiving enable signal and the input control signal carried on the guard band subcarrier set in the first OFDM signal to generate a second OFDM signal;
 a frequency division multiplexing bandpass filter bank, being electrically connected to the fiber transceiver and being configured to retrieve the transmitting/receiving enable signal and the input control signal from the guard band subcarrier set of the first OFDM signal;
 a synchronization circuit, being electrically connected to the frequency division multiplexing bandpass filter bank and being configured to perform a clock synchronization with the base station according to the transmitting/receiving enable signal; and
 a control circuit, being electrically connected to the frequency division multiplexing bandpass filter bank and being configured to perform a system configuration according to the input control signal, switch between a transmitting mode and a receiving mode periodically according to the transmitting/receiving enable signal and transmit the second OFDM signal to a user device in the transmitting mode.

18. The RAU of claim 17, wherein the RF transceiver further receives a user uplink signal from the user device in the receiving mode.

19. The RAU of claim 18, wherein the control circuit further generates an output state signal and transmits the output state signal to the frequency division multiplexing bandpass filter bank, the fiber transceiver combines the user uplink signal with the output state signal to generate a third OFDM signal and transmits the third OFDM signal to the base station via the fiber transmission line, the user uplink signal is carried on the used subcarrier set of the third OFDM signal, and the output state signal is carried on the guard band subcarrier set of the third OFDM signal.

20. The RAU of claim 19, wherein the transmitting/receiving enable signal and the input control signal are interleavingly carried on the guard band subcarrier set in the first OFDM signal, and the output state signal is interleavingly carried on the guard band subcarrier set of the third OFDM signal.

* * * * *